Patented Mar. 6, 1951

2,543,897

UNITED STATES PATENT OFFICE 2,543,897

METHOD OF INCREASING THE RIBOFLAVIN CONTENT OF LIQUID BIOLOGICALLY ACTIVE OR NUTRITIVE MATERIALS

George I. de Becze, Cincinnati, Helen N. Moore, North College Hill, and Elizabeth Schraffenberger, Cincinnati, Ohio, assignors to Schenley Industries, Inc., a corporation of Delaware No Drawing. Application March 26, 1947, Serial No. 737,420

4 Claims. (Cl. 195—35)

Our invention relates to a method of increasing the riboflavin content of liquid biologically active or nutritive materials, by means of the action of "Eremothecium ashbyii." This microorganism is listed in American Type Culture Collection, Georgetown University, School of Medicine, forth edition, Washington, D. C., 1938, page 58, #6747. This microorganism is also disclosed in Rudert, U. S. Patent No. 2,374,503 and in Piersma, U. S. Patent No. 2,400,710.

As one example of our invention, and without limiting the invention thereto, the liquid residue is the product designated as "distillers' stillage."

In producing whiskey, a mash of a cereal or mixture of cereals is fermented by the brewers' type of yeast, as exemplified by *Saccharomyces cerevisae* to produce an alcoholic beer, and the alcohol and certain other volatile constituents are removed from it by distillation.

The entire still residue is designated as "distillers' stillage" or "distillers' slop."

The composition of the entire still residue varies, according to the cereal or cereals used to make the mash.

In general, such entire "distillers' stillage" contains about 93 to 95% by weight of water. The solids of such "distillers' stillage" consists of dissolved solids, very fine and colloidally suspended solids, and coarse solids which can be removed by screening, or settling, or mechanical means, such as centrifuging or filter pressing.

After the coarse solids have been removed, as by screening, the residual "distillers' stillage" is designated as "distillers' thin stillage" or "thin slop." On the average, such "distillers' thin stillage" has 3 to 5% of dissolved and suspended solids by weight.

This "thin slop" is described in U. S. Patent No. 965,521 granted July 26, 1910; No. 2,070,286 granted February 9, 1937; and No. 2,082,711 granted June 1, 1937. We can treat either the thin slop or the whole slop.

We prefer to treat the "distillers' thin stillage" but the invention is not limited thereto. It is highly desirable to dilute the stillage with water, either the original entire stillage or the "thin stillage," so that the diluted stillage contains 0.5% to 1% of solids by weight. This is important in enriching the stillage with riboflavin. The "distillers' thin stillage" is thus preferably diluted with water.

The undiluted "distillers' thin stillage" usually contains less than ½% by weight of fermentable carbohydrates. The undiluted "distillers' thin stillage" contains a somewhat larger amount of B-vitamins than the original cereal or grain, due to the action of the yeast during the alcohol-producing fermentation. When such "distillers' thin stillage" is dried to about 4%–6% of water by weight, such dry product usually has a riboflavin content varying from 12 to 20 micrograms per gram of solids. However, the invention is not limited to any specific initial riboflavin content.

Without limiting our invention thereto, a typical cereal mash for making rye whiskey consists of 80% by weight of rye and 20% by weight of barley malt, and a typical cereal mash for making bourbon whiskey consists of 80% maize, 12% of barley malt, the remainder being rye, said proportions being by weight.

The use of "distillers' stillage" which is a grain or cereal residue, as a starting material, presents special problems in propagating this microorganism.

We have discovered that as a result of the yeast fermentation and subsequent treatment of the fermented beer, the stillage is deficient in nitrogen-containing and phosphorus-containing substances, in the form required for the efficient propagation of this microorganism, although said stillage contains nitrogen-containing and phosphorus-containing materials. Hence, we have found it necessary to enrich such stillage with suitable nitrogen-containing and phosphorus-containing materials.

Also, we have found that if the pH of such undiluted stillage is at the usual value of 4 or less, it is desirable for efficient propagation to adjust such pH to substantially 5–6, prior to starting the propagation of the mold in the stillage, either the entire and undiluted "distillers' stillage," or the undiluted "distillers' thin stillage," or the diluted "distillers' stillage" or the diluted "distillers' thin stillage."

We have also found that by combining these factors with suitable carbohydrate enrichment, we can secure an optimum and high ultimate yield, during a propagation period which is as short as a maximum of 72 hours, when we utilize suitable aeration and agitation under sterile conditions, as later disclosed herein.

Our invention is further explained in the following examples, without being limted thereto.

*Step No. 1*

A pure culture of *E. ashbyii* is maintained at 28–32° C. on Sabaraud maltose agar with an initial pH of 6.5, as one example of preferred pH. The volume of 2 test tubes of this culture, namely, about 10 ml., is transferred to a sterile Erlenmeyer flask which has a volume of 500 ml. and which contains 50 ml. of a sterile, aqueous and nutrient semi-solid medium.

As an example, said semi-solid medium may consist of the following:

| Ingredient | Proportion, gr. in 100 ml. |
|---|---|
| "Difco" dried yeast extract | ½ |
| Peptone or meat extract | ½ |
| Dextrose or maltose | 0.5 |
| Agar | $^{1}/_{10}$ |
| Sodium Chloride | ½ |

The "Difco" yeast extract is a yeast extract of standard composition.

Said semi-solid medium has enough water, so that the weight of 50 ml. of semi-solid medium is about 50 grams.

This semi-solid medium has a large exposed surface in said Erlenmeyer flask, so that it is efficiently aerated during the first shaking period, by the sterile air in said Erlenmeyer flask.

This flask is sealed with a cotton plug, and the flask and its contents are shaken for 72 hours at the preferred range of about 29° C.–32° C. The micro-organism is substantially inhibited in this process above substantially 40° C., and it is somewhat inhibited above 35° C. Hence the maximum temperature is substantially 35° C., with a preferred range of substantially 29° C.–32° C. or 29° C.–33° C. The yield decreases as the temperature decreases below 27° C. with very little yield, if any, below 20° C. The organism is thus propagated in said semi-solid medium at a suitable propagation temperature by submerged culture.

The entire resultant culture is then transferred to a second sterile Erlenmeyer flask which has a volume of 2,000 ml. and which contains 500 ml. of a sterile, synthetic aqueous broth medium. This synthetic broth medium contains one or more inorganic salts, such as ammonium sulfate, monobasic potassium phosphate, magnesium sulfate, etc.

As one example, such synthetic broth medium may consist of the following:

| Ingredient | Proportion, gr. in 100 ml. |
|---|---|
| $KH_2PO_4$ | 0.1 |
| $MgSO_4.7H_2O$ | 0.1 |
| $CaCl_2.2H_2O$ | 0.02 |
| $(NH_4)_2SO_4$ | 0.4 |
| Dextrose | 4.0 |
| Asparagine | 0.4 |
| Biotin P.P.M. | 0.01 |
| Iodine P.P.M. | 0.1 |

The contents of this second flask also have a large exposed surface in said flask, to provide efficient aeration by sterile air during the propagation in the second shaking period. This second flask is sealed with a cotton plug, and said flask and its content are shaken for about 72 hours at approximately 29°–32° C.

The entire resultant culture is transferred into a third sterile flask which has a volume of 5 gallons and which contains 5 liters of the above-mentioned semi-solid and sterile medium. This flask is also shaped so that its contents have a large exposed surface, to provide efficient aeration by sterile air during the propagation. The third flask is sealed with a cotton plug, said flask and its content are shaken for about 24 hours at approximately 29°–32° C.

The air pressure of the gases in these three shaking and propagation flasks is about 760 mm. of mercury.

The entire resultant culture is then transferred into 50 liters of pre-treated sterile "distillers' thin stillage," produced as later specified in Step No. 2, and the mixture is efficiently aerated by sterile air and agitated for about 72 hours at a temperature of approximately 29°–32° C., in order further to propagate the *E. ashbyii*.

During this period and generally throughout the process, we maintain complete aseptic conditions, since the activity of *E. ashbyii* may be impaired by bacterial contaminants.

The resultant liquid culture is used as an inoculum in Step No. 3.

Step No. 2

The coarse solids of the "distillers' stillage" are removed, as by screening, in order to provide the "distillers' thin stillage." This last-mentioned product has an average of 3–5% solids by weight.

Its original pH is usually below 4, as about 3.9, due mainly or wholly to the presence of lactic, tartaric, and other organic acids.

To get a maximum yield of riboflavin, we supplement the "distillers' thin stillage" with carbohydrate material and with inorganic water-soluble nitrogenous and phosphorus compounds.

The carbohydrate material may be starch paste, or wheat flour, which contains about 75% by weight of carbohydrates.

The inorganic nitrogen-containing compounds are exemplified by ammonium sulfate and aqueous ammonia.

The inorganic phosphorus-containing compounds are exemplified by calcium superphosphate, $CaH_4(PO_4)_2.H_2O$, also designated as monobasic calcium phosphate.

The carbohydrate supplement is equivalent in nutrient value to about 5–10% by weight of starch, calculated upon the weight of the solids in the "distillers' thin stillage."

The nitrogen supplement corresponds to 1–2% by weight of ammonium sulfate, calculated upon the weight of the solids in the "distillers' thin stillage." This corresponds to about 0.2–0.4% of inorganic nitrogen, calculated upon the weight of the solids in the "distillers' thin stillage."

The phosphorus supplement corresponds to 2–4% by weight of calcium superphosphate, calculated on the weight of the solids in the "distillers' thin stillage." This corresponds to about 0.16%–0.32% inorganic phosphorus, calculated as above upon the solids of the "distillers' thin stillage."

In order to secure a maximum yield of riboflavin, we also adjust the pH of the "distillers' thin stillage" to 5.0–6.0 by adding a suitable base, such as calcium hydroxide.

Thus, 1000 ml. of "distillers' thin stillage" resulting from a typical rye whiskey mash, has a weight of about 1000 grams. As an example, we supplement such 1000 ml. by 2.5 grams of starch paste, or by 3.35 grams of said wheat flour, and we also add ½ to 1 gram of ammonium sulfate and 1–2 grams of calcium superphosphate.

The supplemented and adjusted "distillers' thin stillage" is sterilized by heating it to about 115° C., in a closed vessel, during a period of about 45 minutes.

As previously noted, the original "distillers' thin stillage" may be diluted with water to diminish its original solids content from 3%-5% by weight, to 0.5%-1% of such solids by weight and this is highly desirable. This dilution may be performed prior to or subsequent to said supplementation and adjustment. The required volume of sterile water can be added to said supplemented and adjusted "distillers' thin stillage."

Step No. 3

50 liters of the inoculum which has been prepared according to Step No. 1, is added to 1000 gallons of pretreated and sterile "distillers' thin stillage," supplemented and prepared according to Step No. 2, which may be undiluted but which is preferably diluted as previously specified. Before the inoculum is added, the temperature of the "distillers' thin stillage," is reduced to about 30° C., either diluted or undiluted.

The mixture is vigorously agitated and aerated under aseptic conditions by finely distributed and sterile air for a period of about 48-72 hours, while the temperature is maintained between approximately 29° C.-32° C. For this purpose, the sterile air is supplied at the rate of 0.1-0.5 gallon of air per gallon of liquid medium per minute.

The culture of E. ashbyii is thus kept in the best "phase" of development by proper conditions of aeration and temperature. It is desirable that the temperature should not exceed about 33° C. during this biological treatment of the liquid medium.

At the end of this period of about 48-72 hours, the pH of the biologically treated "distillers' thin stillage" is about 6.8-8.2.

This pH is adjusted to about 5.5 by the addition of a suitable acid, such as dilute hydrochloric or sulfuric acid.

Optimum propagation is obtained during a period of 72 hours under the conditions disclosed herein.

In one test, we used fifteen gallons of the inoculated undiluted "distillers' thin stillage" which was a cylindrical pool of uniform depth. The diameter of said pool was substantially 1.5 feet. We used sterile air at the rate of 0.1 gallon to 0.5 gallon of air per gallon of liquid medium per minute, with a high-speed mechanical agitator, which supplied the air in ascending bubbles through the pool, and which mixed the air bubbles with the liquid. Under such conditions, an air supply in excess of the above produces objectionable foaming, with very slight improvement, if any, in the propagation. Below said range of air supply, the propagation is lowered.

When the original "distillers' thin stillage" is diluted with water as previously mentioned, it is preferable to supply the sterile air at the rate of 0.1 gallon to 0.5 gallon of air per gallon of diluted "distillers' thin stillage" per minute, or said rate can be calculated upon the volume of the "distillers' thin stillage" prior to dilution, or said rate can be intermediate said respective rates. However, it is preferable to calculate the rate of air supply upon the volume of the medium, either diluted or undiluted.

Step No. 4

The product which results from Step No. 3 is concentrated under a reduced pressure of about 150-250 mm. of mercury at a temperature below about 72° C., until the concentrated product contains 20%-35% solids by weight.

This concentrate is then dehydrated, preferably by any conventional quick-drying process, at a temperature of not exceeding 100° C. to a moisture content of about 4%-6% by weight.

Example No. 1

This illustrates the action of E. ashbyii on sterile "distillers' thin stillage" which has not been supplemented, at the original pH of said "distillers' thin stillage" of about 3.9.

10 ml. of said culture of E. ashbyii was transferred to 50 ml. of said sterile "distillers' thin stillage" in a sterile propagating Erlenmeyer flask which had a volume of 500 ml.

This flask was sealed with a cotton plug and shaken for 72 hours at a temperature varying between 29° C. and 32° C. As previously noted, the contents of the flask had a large exposed surface, to provide efficient aeration by the sterile air in the flask during the shaking.

Analysis showed that the riboflavin content was not increased substantially, 20 micrograms of riboflavin per gram of solids being found.

Example No. 2

The "distillers' thin stillage" product was not supplemented, but its pH was adjusted to 5.5 by the addition of calcium hydroxide.

Otherwise, the procedure of Example No. 1 was followed.

Analysis showed that the riboflavin content was increased to 100 micrograms per gram of solids, thus proving the value of the pH adjustment.

Example No. 3

The procedure was the same as in Example No. 2, save that the "distillers' thin stillage" was supplemented with inorganic nutrients and also with carbohydrates as previously stated herein.

As in previous examples, the batch was held in a 500 ml. Erlenmeyer flask, so as to provide a large exposed surface for aeration by the sterile air in said flask, during the shaking.

Analysis showed that the riboflavin content of the "distillers' thin stillage" was thus increased to 500 micrograms per gram of solids.

Example No. 4

This illustrates the complete and preferred method.

A volume of 10 ml. of the culture disclosed in Step No. 1, with a pH of 5.5, was transferred to 50 ml. of said semi-solid medium, and the mixture was aerated and shaken for 72 hours at a temperature varying between 29° C. and 32° C.

The resultant entire culture was then transferred to 50 ml. of said synthetic broth, said broth being at a pH of 5.5, and the mixture was aerated and shaken for 72 hours at a temperature varying between 29° C. and 32° C.

The resultant entire culture was transferred to 5000 ml. of said semi-solid medium, said culture being at a pH of 5.5, and the mixture was aerated and shaken for 24 hours at a temperature varying between 29° C. and 32° C.

The culture was then transferred to 50 liters of sterile "distillers' thin stillage" supplemented as previously stated, the pH of which had been adjusted to 5.5 by means of calcium hydroxide.

This mixture, which had a volume of 75 liters, was aerated and agitated in a tank for 72 hours at a temperature varying between 29° C and 32° C.

Analysis showed that the riboflavin content was thus increased to 6,580 micrograms per gram of solids.

Other tests have shown that we can increase the riboflavin content of "distillers' thin stillage" to 2,000–10,000 micrograms per gram of solids.

We use a chemical treatment, in which "distillers' thin stillage" is supplemented with inorganic salts which contain nitrogen and phosphorus, and may be further supplemented with starch or other carbohydrate material, and the pH is adjusted, and the resultant liquid is then sterilized.

We also use a biological treatment, in which the sterile medium, cooled to a temperature which does not exceed 33° C., is inoculated with a properly prepared culture of E. ashbyii and said microorganism is propagated during a propagation period of 48–72 hours under vigorous agitation and aeration at a temperature which does not exceed 33° C., so that the culture which is used as the inoculum is kept in the proper "phase" of development.

The culture of E. ashbyii is kept in its best phase of development by first transferring it to said semi-solid medium, then to said synthetic broth, then again to said semi-solid medium, and finally to the medium to be enriched in riboflavin.

We have disclosed preferred embodiments of our invention, but numerous changes and omissions and additions can be made without departing from the scope of our invention.

In addition to preparing ethyl alcohol from the starches of cereals, it is also well known to produce the same from other starch materials, and also from sugar and molasses. We can use any of the resultant de-alcoholized still residues. The E. ashbyii is propagated at a temperature whose minimum is preferably substantially 22° C.

We claim:

1. A method of treating distillers' stillage to increase its content of B-vitamins, by means of the organism Eremothecium ashbyii, which consists in supplementing said stillage with inorganic nitrogen and phosphorus nutrient and with carbohydrate nutrient for said organism, adjusting the pH of said supplemented stillage to substantially 5–6, sterilizing said supplemented and adjusted stillage, inoculating said sterilized supplemented and adjusted stillage with said organism, and propagating said organism in said sterilized supplemented and adjusted stillage at a temperature of substantially 29° C.–32° C. while agitating and aerating said sterilized supplemented and adjusted stillage, the inoculum of said organism being a culture of said organism which has been propagated in said supplemented and adjusted sterile stillage under aeration and agitation and which is intermixed with said supplemented and adjusted stillage.

2. A method of producing riboflavin, which consists in removing the coarse solids of entire distillers' stillage to produce distillers' thin stillaage which has substantially 3–5% of solids by weight, supplementing said distillers' thin stillage with inorganic water-soluble, nitrogenous and phosphorus nutrient and with carbohydrate nutrient for the organism Eremothecium ashbyii, the inorganic nitrogen supplement being substantially 0.2–0.4% by weight of said solids, the inorganic phosphorus supplement being substantially 0.16%–0.32% by weight of said solids, the carbohydrate supplement being equivalent in nutrient value to substantially 5–10% by weight of starch as calculated upon the weight of said solids adjusting the pH of said supplemented stillage to 5–6 and sterilizing said supplemented stillage, inoculating said sterilized stillage with said organism, and propagating said organism in said sterilized stillage at 29° C.–32° C. under aeration and agitation.

3. A method of producing riboflavin, which consists in removing the coarse solids of entire distillers' stillage to produce distillers' thin stillage which has substantially 3–5% of solids by weight, diluting said distillers' thin stillage with water to produce a dilution which has substantially 0.5%–1% of said solids by weight, supplementing said diluted thin stillage with inorganic water-soluble nitrogenous and phosphorus nutrient and with carbohydrate nutrient for the organism Eremothecium ashbyii, the inorganic nitrogen supplement being substantially 0.2–0.4% by weight of said solids, the inorganic phosphorus supplement being substantially 0.16%–0.32% by weight of said solids, the carbohydrate supplement being equivalent in nutrient value to substantially 5–10% by weight of starch as calculated upon the weight of said solids, adjusting the pH of said diluted and supplemented stillage to 5–6 and sterilizing said diluted and supplemented stillage, inoculating said diluted and sterilized stillage with said organism and propagating said organism in said sterilized stillage at 29° C.–32° C. under aeration and agitation, the inoculum of said organism being a culture of said organism which has been propagated in said supplemented and adjusted sterile stillage under aeration and agitation and which is mixed with said supplemented and adjusted stillage used for propagation.

4. A method according to claim 3, in which the inoculum of said organism is a culture of said organism which has been propagated in said supplemented and adjusted distillers' thin stillage under aeration and agitation, and which is intermixed with said distillers' thin stillage used for progagation.

GEORGE I. DE BECZE.
HELEN N. MOORE.
ELIZABETH SCHRAFFENBERGER.

REFERENCES CITED

The following references are of record in the file of this patent:

UNITED STATES PATENTS

| Number | Name | Date |
|---|---|---|
| 1,532,858 | Bacon | Apr. 7, 1925 |
| 2,098,200 | Stiles | Nov. 2, 1937 |
| 2,374,503 | Rudert | Apr. 24, 1945 |
| 2,400,710 | Piersma | May 21, 1946 |
| 2,445,128 | Tanner | July 13, 1948 |
| 2,483,855 | Stiles | Oct. 4, 1949 |

FOREIGN PATENTS

| Number | Country | Date |
|---|---|---|
| 17,374 | Great Britain | of 1891 |

OTHER REFERENCES

Schopfer, Helvetica Chimica Acta V, XXVII, Aug. 1, 1944, p. 1019.

Wickerham et al., Archives of Biochem., vol. 9, No. 1, Jan. 1946 (pp. 1017 to 1032), p. 1019 relied upon.

Henrici, Molds, Yeasts and Actinomyces (2 ed.), Wiley, pp. 218, 219.